(12) United States Patent
Leyko et al.

(10) Patent No.: US 10,550,715 B2
(45) Date of Patent: Feb. 4, 2020

(54) GYRATORY-EFFECT FLOW DEFLECTOR OF A DISCHARGE VALVE SYSTEM, DISCHARGE VALVE SYSTEM AND TURBINE ENGINE COMPRISING SUCH A DISCHARGE VALVE SYSTEM

(71) Applicant: SAFRAN AIRCRAFT ENGINES, Paris (FR)

(72) Inventors: Matthieu Leyko, Orsay (FR); Julien Antoine Henri Jean Szydlowski, Montrouge (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 78 days.

(21) Appl. No.: 15/721,262

(22) Filed: Sep. 29, 2017

(65) Prior Publication Data
US 2018/0094535 A1    Apr. 5, 2018

(30) Foreign Application Priority Data
Sep. 30, 2016    (FR) ...................................... 16 59471

(51) Int. Cl.
*F01D 17/10*    (2006.01)
*F02C 6/08*    (2006.01)
*F02K 3/075*    (2006.01)
*F02C 9/18*    (2006.01)

(52) U.S. Cl.
CPC .............. *F01D 17/105* (2013.01); *F02C 6/08* (2013.01); *F02C 9/18* (2013.01); *F02K 3/075* (2013.01);
(Continued)

(58) Field of Classification Search
CPC .. F01D 17/105; F02C 6/08; F02C 9/18; F05D 2260/14; F04D 27/0215
See application file for complete search history.

(56) References Cited

U.S. PATENT DOCUMENTS

| 7,387,489 B2* | 6/2008 | Appleby ............... F01D 17/105 |
| | | 415/121.2 |
| 7,797,945 B2* | 9/2010 | Appleby .................. F02C 6/08 |
| | | 415/144 |

(Continued)

FOREIGN PATENT DOCUMENTS

| EP | 1 854 989 A2 | 11/2007 |
| EP | 1 892 399 A2 | 2/2008 |
| EP | 2 339 143 A2 | 6/2011 |

OTHER PUBLICATIONS

Preliminary Search Report and Written Opinion of the Institut National de la Propriété Industrielle dated May 22, 2017, for French Application No. 1659471, filed Sep. 30, 2016, 7 pages.

(Continued)

*Primary Examiner* — Kevin R Steckbauer
(74) *Attorney, Agent, or Firm* — Christensen O'Connor Johnson Kindness PLLC

(57) ABSTRACT

A discharge valve system of a bypass turbine engine compressor includes a flow deflector. The flow deflector has a wall provided with a plurality of ejection channels configured to discharge a discharge airflow from the compressor in a duct of the turbine engine in which an airflow circulates. The ejection channels are disposed in a plurality of concentric rows around a center and are oriented at an angle defined between a straight line normal to the wall and the axes of the ejection channels. The angle of the ejection channels vary by increasing from the peripheral edge towards the center of the wall so that the discharge airflow passing through the ejection channels is guided in a gyratory movement around the center.

12 Claims, 5 Drawing Sheets

(52) U.S. Cl.
CPC ...... *F05D 2210/30* (2013.01); *F05D 2250/25* (2013.01); *F05D 2260/14* (2013.01)

(56) References Cited

U.S. PATENT DOCUMENTS

| | | | | |
|---|---|---|---|---|
| 7,946,104 B2* | 5/2011 | Frank | ............... | F01D 17/105 60/226.1 |
| 8,128,347 B2* | 3/2012 | Sokhey | ............... | F01D 17/105 415/144 |
| 8,915,085 B2* | 12/2014 | Balandier | ............ | F01D 17/105 60/725 |
| 8,925,330 B2* | 1/2015 | Britchford | ............ | F01D 17/105 415/114 |
| 2007/0086885 A1* | 4/2007 | Appleby | ............... | F01D 17/105 415/145 |
| 2007/0261410 A1* | 11/2007 | Frank | ............... | F01D 17/105 60/785 |
| 2008/0050218 A1* | 2/2008 | Sokhey | ............... | F01D 17/105 415/119 |
| 2008/0053105 A1* | 3/2008 | Appleby | ............... | F02C 6/08 60/785 |
| 2011/0146297 A1* | 6/2011 | Balandier | ............ | F01D 17/105 60/785 |
| 2011/0167834 A1* | 7/2011 | Britchford | ............ | F01D 17/105 60/795 |

OTHER PUBLICATIONS

United Kingdom Search Report dated Mar. 21, 2018, issued in corresponding application GB1715605.0, 3 pages.

\* cited by examiner

GYRATORY-EFFECT FLOW DEFLECTOR OF A DISCHARGE VALVE SYSTEM, DISCHARGE VALVE SYSTEM AND TURBINE ENGINE COMPRISING SUCH A DISCHARGE VALVE SYSTEM

BACKGROUND

The present invention relates to the field of turbine engines, in particular bypass turbine engines for aircraft. It relates in particular to a discharge valve system for discharging part of an airflow passing through a compressor in a duct of the turbine engine. It also relates to a turbine engine comprising such a discharge system.

A bypass turbine engine comprises, in general terms, from upstream to downstream according to the flow of the gases in the turbine engine, at least one compressor, a combustion chamber and a turbine forming a gas generator that is installed in an inner casing. A movable fan is disposed upstream of the gas generator and in an outer casing that also comprises the inner casing. The air passing through the turbine engine is divided into a primary flow or hot airflow circulating in the gas generator, and a secondary flow or cold airflow coming from the fan and circulating around the inner casing. The hot airflow is compressed by compressor stages of the turbine engine before entering the combustion chamber. The combustion energy is recovered by turbine stages, which participate in driving the compressor stages and the upstream movable fan, and therefore participate in the thrust of the turbine engine. The cold flow also participates in the thrust of the turbine engine.

Turbine engines are also equipped with one or more discharge valve systems known by the English term "handling bleed valve" (abbreviated to HBV), making it possible to remove part of the hot airflow compressed by the compressor, and in particular a high-pressure compressor, and to inject it into the cold airflow with which it mixes. The purpose of this discharge is to stabilise the functioning of the compressor by limiting the phenomena of surge, rotating stall and flutter.

Various types of discharge valve system comprising a flow deflector provided with a plurality of openings oriented in the same direction are known from EP-A2-1 892 399, US-A1-2011/167834 and US-A1-2008/053105. These openings discharge the airflow from the compressor either in the direction of the cold flow or in the direction opposite to the cold flow. Other discharge valve systems comprise a flow deflector having openings with variable diameters depending on their positioning in order to form matrices of particular forms and to vary the rate of the airflow coming from the compressor to be ejected into the cold airflow. These arrangements make it possible to increase the incorporation of the hot airflow discharged into the cold airflow in order to limit thermal stresses on the adjacent structures and/or components that are not designed to withstand high temperatures.

However, these arrangements do not consider or do not offer solutions making it possible to limit disturbances to the cold airflow generated by the fan, which air goes back up the fan operating line in a compression-flowrate field and impacts on the functioning of the turbine engine.

The present applicant has therefore set itself the objective of providing a flow deflector of a compressor discharge valve system that makes it possible to limit disturbance to the cold airflow while limiting thermal stresses on the environment of the duct in which an airflow is circulating.

SUMMARY

This objective is achieved in accordance with the invention by virtue of a flow deflector of a discharge valve system of a bypass turbine engine compressor, the flow deflector being intended to be arranged at least partly in a duct of the turbine engine in which an airflow is circulating and comprising a wall provided with a plurality of ejection channels able to discharge a discharge airflow from the compressor in a duct of the turbine engine in which another airflow is circulating, the ejection channels being disposed in a plurality of concentric rows and oriented at an angle defined between a straight line normal to the wall and the axes of the ejection channels, and varying by increasing from the peripheral edge towards the centre of the wall so that the discharge flow passing through the ejection channels guides the discharge airflow in a gyratory movement around the centre, and in that at least one row of channels arranged in the vicinity of the peripheral edge is designed so that the discharge flow does not burn the wall of the duct.

This flow deflector makes it possible to resolve the aforementioned drawbacks. The design of the ejection channels enables the discharge airflow jet to be ejected in a swirling manner in order to generate a vortex of hot air that gradually mixes the airflow flowing and circulating in the secondary duct of the turbine engine while keeping the hot air clear of the sensitive walls. This "vortex" keeps the hot discharge airflow clear of the bottom wall of the secondary duct owing to the near verticality of the channels of the peripheral rows, and a strong gyratory movement is generated at the centre of the vortex by virtue of the strong inclination of the channels of the central rows, thus making it possible to prevent the hot discharge airflow impacting on the top wall of the secondary duct.

According to one feature of the invention, the angle of the rows varies between 0° and 70° between the peripheral edge and the centre of the wall.

Preferentially, the angle of the rows varies between 10° and 60°.

According to one feature of the invention, the angle of the channels in the row in the vicinity of the peripheral edge is around 10°.

According to another feature, the angle of at least one row of channels in the vicinity of the centre of the deflector is around 60°.

According to one feature of the invention, the ejection channels of each row are oriented at the same angle.

According to one feature of the invention, the angles vary by 3° to 8° between two consecutive rows so that the variation is progressive and linear.

Advantageously, but in a non-limiting manner, the wall has a central portion with no ejection channel. This design makes it possible not to disturb the gyratory movement of the discharge airflow. This also makes it possible to comply with the output surface specifications.

According to another advantageous but non-limiting feature of the invention, the ejection channels occupy at least 50% of the surface area of the wall of the flow deflector for the purpose of also complying with the output surface specifications.

According to one feature of the invention, the wall of the flow deflector is spherical in shape.

According to another feature of the invention, the flow deflector comprises a cylindrical body having a circular cross section coupled to the air inlet and to the flow deflector, the body defining a passage between the air inlet and the flow deflector.

According to another feature of the invention, each ejection channel passes through on either side the wall and has a constant circular cross section.

According to another feature of the invention, the wall has a constant thickness of between 1 and 5 mm.

The invention also relates to a discharge valve system of a bypass turbine engine compressor comprising:

a flow deflector having any of the aforementioned features, a pipe connected to the flow deflector and comprising a hot-air inlet, a regulation device for regulating the passage of the discharge airflow between the hot-air inlet of the pipe and the flow deflector, and an actuator acting on the regulation device so that the device occupies at least a first position in which the hot-air inlet is closed and a second position in which the hot-air inlet is free.

According to one feature of the invention, the regulation device may occupy an intermediate position between the first position and the second position.

The invention also relates to a bypass turbine engine comprising a primary duct in which a hot flow circulates and a secondary duct in which a cold flow circulates, the ducts being separated by an inter-duct casing, at least one discharge valve system having any of the aforementioned features being arranged in the inter-duct casing.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
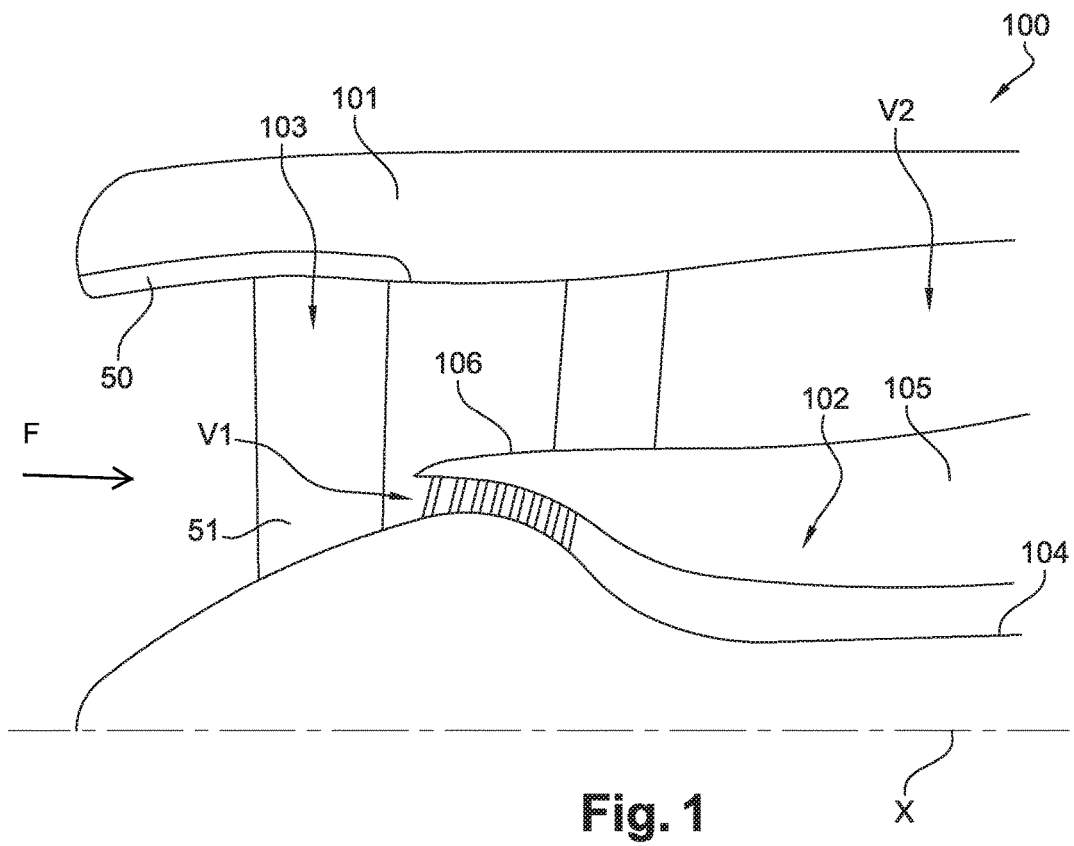
FIG. 1 shows, in axial and partial cross section, an example of a turbine engine to which the invention applies.

FIG. 1 schematically shows a turbine engine for an aircraft according to the invention. In particular, a bypass turbine engine that extends along an axis X is depicted. This turbine engine 100 comprises, in general terms, an external casing 101 surrounding a gas generator 102 upstream of which a fan 103 is mounted. In the present invention, and in general terms, the terms "upstream" and "downstream" are defined with respect to the circulation of the gases in the turbine engine 100. The terms "top" and "bottom" are defined with respect to a radial axis that is perpendicular to the axis X.

The gas generator 102 comprises, in this example, from upstream to downstream, a low-pressure compressor, a high-pressure compressor, a combustion chamber, a high-pressure turbine and a low-pressure turbine. The gas generator is housed in an inner casing 104.

In this case, the fan 103 is ducted and comprises a shroud 50 secured to the outer casing 101 and surrounding a plurality of movable fan blades 51 that are mounted on and extend radially from a fan shaft connected to a power shaft of the gas generator 102.

The fan 103 compresses the air entering the turbine engine 100, which air is divided into a hot flow circulating in a primary duct V1 that passes through the gas generator, and a cold flow circulating in a secondary duct V2 around the gas generator 102. In particular, the primary duct V1 and the secondary duct V2 are separated by an annular inter-duct casing 105 disposed between the outer casing 101 and the inner casing 104. The hot flow circulating in the primary duct V1 is conventionally compressed by compressor stages before entering the combustion chamber. The combustion energy is recovered by turbine stages that drive the compressor stages and the fan. The cold airflow F circulating in the secondary duct V2 is oriented in an axial direction and, for its part, participates in supplying the thrust of the turbine engine 100.

Figure 2:
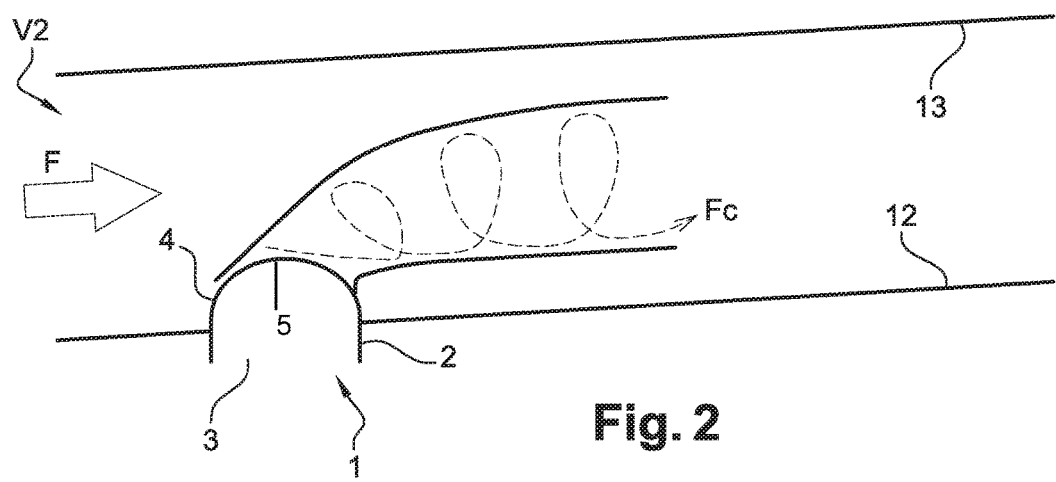
FIG. 2 is a schematic view in axial section of a duct in which a an exemplary embodiment of a discharge valve system having a flow deflector according to the present disclosure is positioned.
Figure 3:
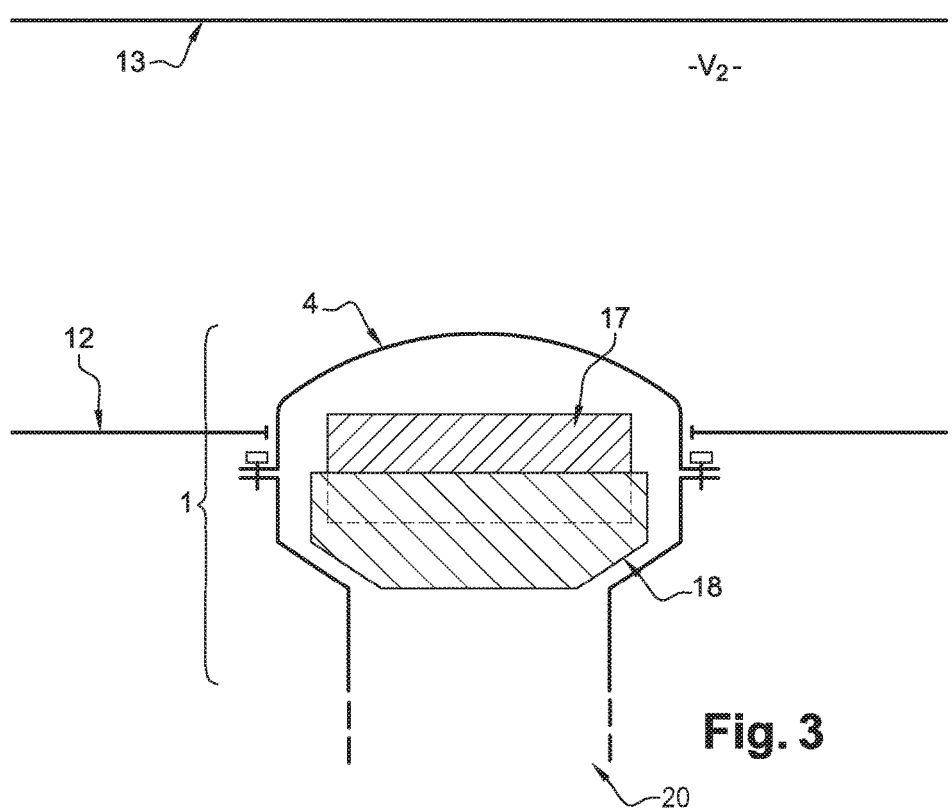
FIG. 3 is a schematic view of the discharge valve system of FIG. 2, the discharge valve system having a regulation device and an actuator acting on the regulation device.

With reference to FIGS. 2 and 3, a discharge valve system 1 is arranged between the primary duct V1 and the secondary duct V2 of the turbine engine 100. The discharge valve system 1 is mounted in a wall 12 of the inter-duct casing 105 and at the location of the high-pressure compressor. In this way, the hot air removed in order to discharge the high-pressure compressor is ejected into the secondary duct V2. The discharge valve system 1 comprises a flow deflector 4, an air regulation device 18, an actuator 17 acting on the regulation device 18 and a pipe 19.

The flow deflector comprises a body 2 coupled to an air inlet 3 and extending from a wall 5. The body 2 has a roughly cylindrical shape with a circular cross section and an axis of revolution R (cf. FIG. 4). The flow deflector 4 comprises a flange 14 secured to the body 2 and surrounding the air inlet 3. This flange allows the flow deflector 1 to be attached on the pipe 17 in the inter-duct casing 105. The flow deflector 4 is intended to be arranged at least partly in the secondary duct V2. The ejection channels are situated in the secondary duct V2. The body 2 defines an air-flow passage between the air inlet 3 and the ejection channels.

The flow deflector 4 is connected to the pipe 19, which extends through the inter-duct casing 105. The pipe 19 comprises a hot-air inlet 20 intended to be in fluid communication with the primary duct V1 and to receive part of the hot flow coming from the high-pressure compressor. The pipe 19 also comprises a hot-air outlet coupled to the air inlet 3 of the flow deflector 4. The pipe 19 allows the hot airflow to pass from the compressor towards the flow deflector 4.

The regulation device 18 and the actuator 17 are disposed in the pipe 19. The device 18 makes it possible to regulate the hot discharge airflow coming from the compressor. The device 18 in this case comprises a needle able to move in translation along a radial axis that is substantially perpendicular to the axis X. The device 18 in this case comprises a movable needle able to move in translation along a radial axis that is substantially perpendicular to the axis X. The needle moves between a first position in which the hot air coming from the compressor does not circulates from the hot-air inlet of the pipe 19 towards the flow deflector, and a second position in which the hot air coming from the compressor circulates from the hot-air inlet of the pipe 19 towards the flow deflector. The first position corresponds to a position where the hot-air inlet of the compressor is closed, and the second position corresponds to a position where the hot-air inlet is open or free. The movement of the needle is controlled by the actuator 17. In particular, when it is necessary to discharge the hot air from the compressor in the secondary duct V2, the actuator 17 causes the needle to move upwards in order to leave clear the hot-air inlet. A discharge airflow Fc is then discharged in the duct V2 via ejection channels described below.

With reference to FIGS. 4 to 7, the flow deflector 4 comprises a wall having a centre A and a peripheral edge 15. The axis of revolution R passes through the centre A of the wall 5. The wall 5 is provided with a plurality of ejection channels 6 able to discharge the hot discharge airflow Fc in the secondary duct V2 where the cold airflow F circulates.

The ejection channels 6 are designed so as to eject a discharge airflow that does not directly come into contact with the walls 12, 13 of the secondary duct V2 and which does not disturb the flow and circulation of the cold airflow F. The wall 5 of the deflector has an arched shape of constant thickness. The thickness of the wall is between 1 and 5 mm. In particular, the wall 5 has a first concave internal surface 7 turned towards the regulation device 18 of the discharge valve system 1, and a second convex external surface 8 opposite to the first internal surface with respect to the axis R and turned towards the secondary duct V1. The wall 5 is spherical in shape here. The peripheral edge 15 is circular. Naturally, a wall and a peripheral edge having a shape other than rectangular can be envisaged.

Figure 6:
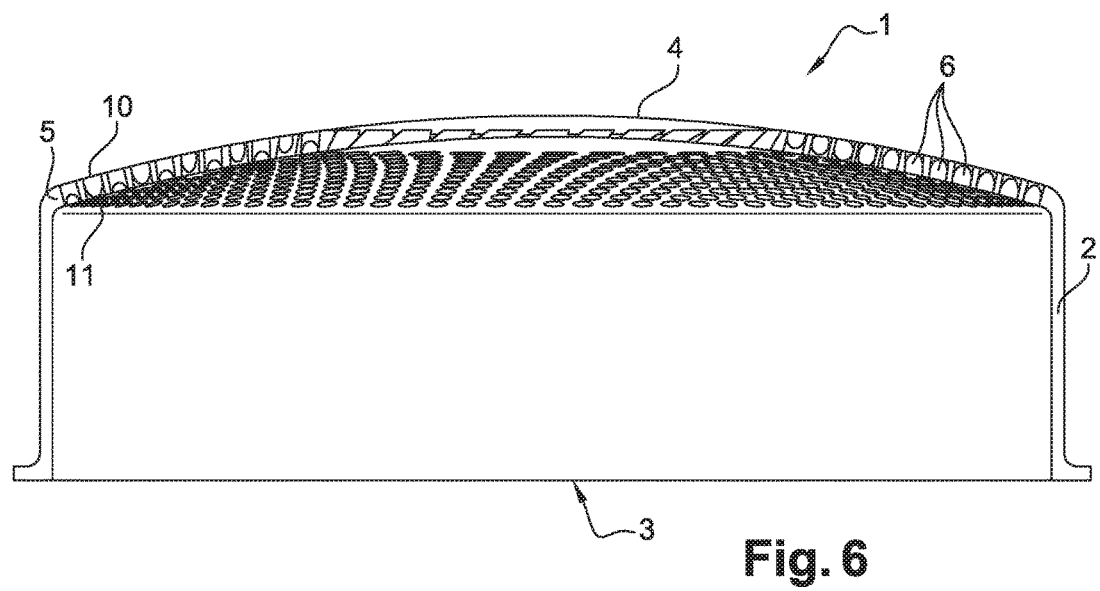
FIG. 6 is a schematic view in axial section of the flow deflector shown in FIG. 2.
Figure 8:
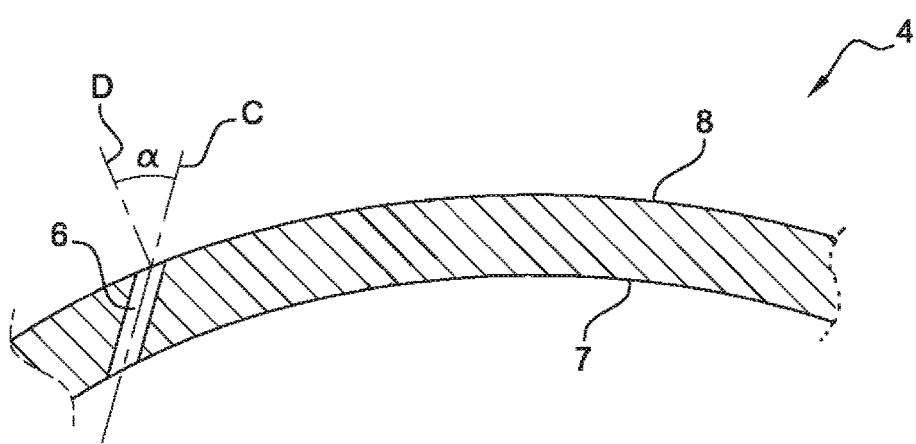
FIG. 8 is a detail view in cross section of a wall of the flow deflector shown in FIG. 2.

With reference to FIGS. 6 and 8, the ejection channels 6 are formed in the wall 5 and extend on either side thereof between the first surface 7 and the second surface 8. The ejection channels 6 in this case have a constant circular cross section of central axis C. Each ejection channel 6 has an inlet aperture 11 defined in the first surface 7 and communicating fluidly with the passage of the body 2 and an outlet aperture 10 defined in the second surface 8 and communicating fluidly with the secondary duct V2. Each ejection channel 6 is oriented at an angle α defined between the central axis C and a straight line D normal to the wall 5 of the flow deflector. The angle α is between 10° and 60°.

Advantageously, but in a non-limiting manner, the ejection channels 6 are disposed in a plurality of concentric rows 9 around the centre A. In the present examples, the rows are disposed in rings around the centre A. The ejection channels 6 occupy at least 50% of the surface of the wall 5, and in particular as from the peripheral edge 15. The number of concentric rows 9 is between 8 and 15. Here, the wall 5 of the flow deflector 4 comprises 11 rows of ejection channels 6 each forming a discharge airflow jet Fc. Each row 9 comprises between 25 and 125 ejection channels 6. Naturally, the number of rows and the number of ejection channels per row depends on the dimensions of the flow deflector and the dimensions of the ejection channels, and the flow rate that is intended to pass through the diffuser when the valve is open. The diameters of the channels distributed over the wall 5 are also identical. Alternatively, the diameters of the ejection channels may vary from the peripheral edge 15 towards the centre A.

Figure 7:
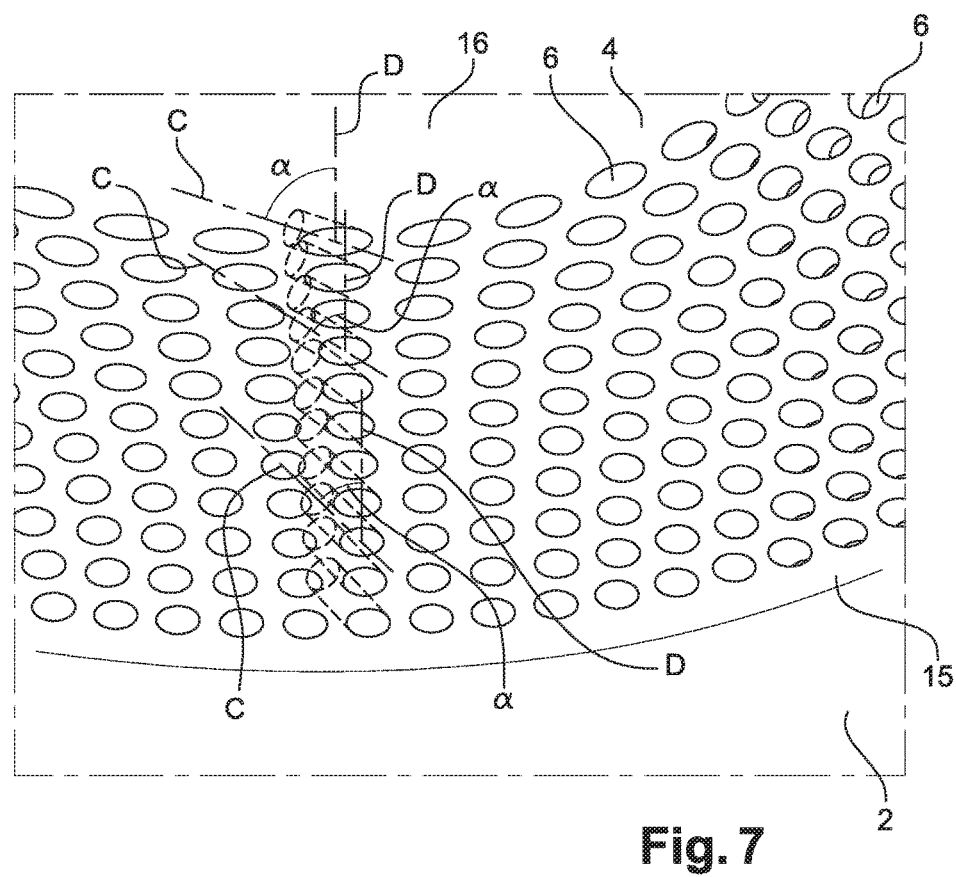
FIG. 7 is a perspective, top and partial view of the flow deflector shown in FIG. 2.

According to one feature of the invention, the ejection channels 6 of each row 9 are oriented at the same angle α so as to form a discharge flow annulus with gyration. With reference to FIG. 7, the ejection channels 6 have been extended so as to illustrate the orientations thereof in the wall 5. The angle α of the rows of ejection channels 6 varies linearly and gradually increasing from the peripheral edge 15 towards the centre A of the wall 5 so that the discharge flow jets passing through the ejection channels 6 are guided in a gyratory movement around the centre A. Advantageously, the angle increases from 10° to 60°.

Thus the discharge airflow Fc circulates in a vortex at a distance from the walls 12, 13 of the secondary duct V2. The row 9 situated on the side of the centre A of the wall 5 allows the discharge flow jet to be substantially tangent to the wall 5 of the flow deflector and prevents it coming into direct contact with the walls of the secondary duct V2. In particular, the orientation of the channels in this row makes it possible not to come into direct contact with the internal wall 13 of the external casing. The channels of the row in the vicinity of the centre A have an angle of approximately 60°. At least one of the rows of the channels situated in the vicinity of the peripheral edge 15 makes it possible for the discharge flow jet to be substantially vertical in order not to burn the walls of the secondary duct. In particular, this orientation makes it possible not to burn the internal wall 12 of the inter-duct casing 105. The channels of this row have an angle of approximately 10°. The axes C of all the channels are oriented in a direction around the centre A so as to create a vortex at the centre of the secondary duct V2. The rows of channels are arranged symmetrically with respect to a median plane passing through the centre A of the wall of the flow deflector.

Advantageously, the angle α of the rows varies at each consecutive row by between 3° and 8°. In other words, two rows of consecutive ejection channels have angles that differ by 3° to 8°.

Figure 4:
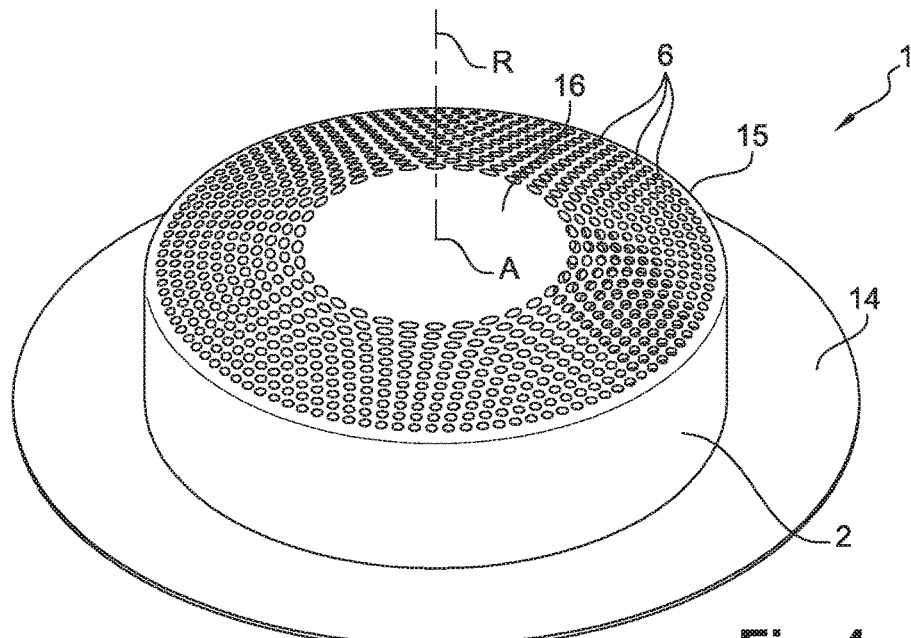
FIG. 4 is a perspective view of the flow deflector shown in FIG. 2.
Figure 5:
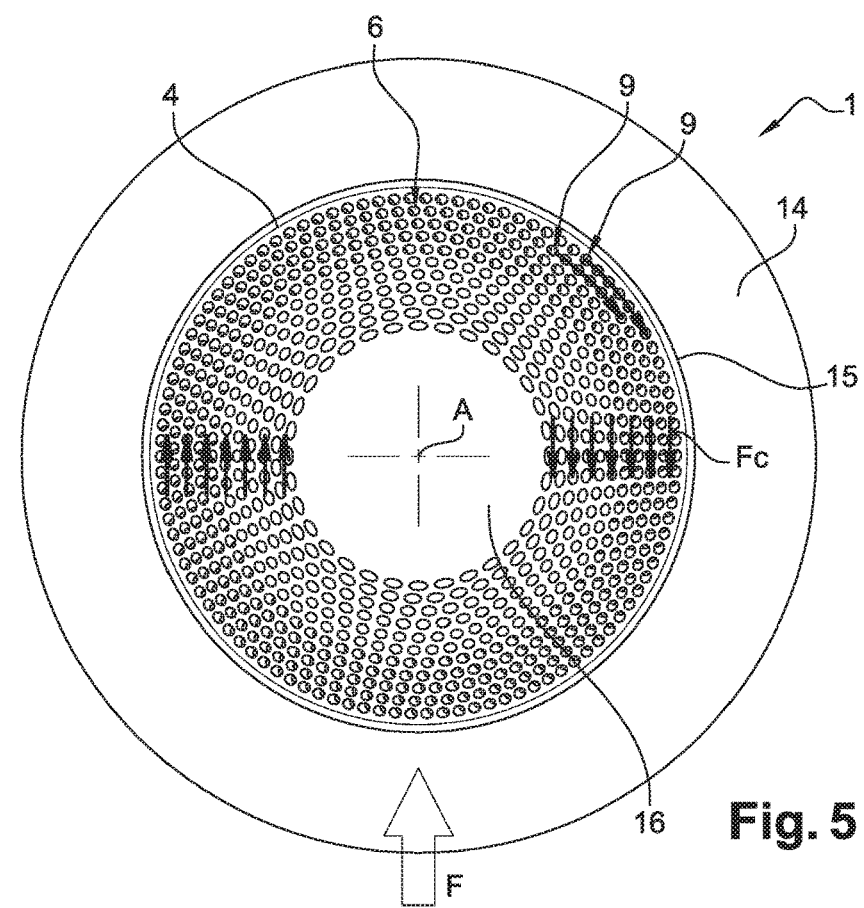
FIG. 5 is a top view of the flow deflector shown in FIG. 2.

As can be seen in particular in FIGS. 4 and 5, the wall 5 has a central portion 16 that has no ejection channels so that the deflector 4 is not supplied at this point and does not reduce the gyratory movement effect sought.

While illustrative embodiments have been illustrated and described, it will be appreciated that various changes can be made therein without departing from the spirit and scope of the invention.

The invention claimed is:

1. A flow deflector of a discharge valve system of a bypass turbine engine compressor, the flow deflector being arranged at least partly in a duct of the turbine engine in which an airflow is circulating and comprising a wall provided with a plurality of ejection channels configured to discharge a discharge airflow from the compressor into the duct, the ejection channels being disposed in a plurality of concentric rows around a center and being oriented at an angle α defined between a straight line normal to the wall and a central longitudinal axis of each ejection channel, wherein the angle α of the ejection channels vary by increasing from a row closest to a peripheral edge of the wall to a row closest to a center A of the wall so that the discharge airflow passing through the ejection channels is guided in a gyratory movement around the center, and in that at least one row of channels arranged closest to the peripheral edge is configured so that the discharge flow does not burn a wall of the duct.

2. The flow deflector according to claim 1, wherein the angle α of the channels varies between 0° and 70° between the peripheral edge and the center A of the wall.

3. The flow deflector according to claim 1, wherein the angle α of the channels in a row closest to the peripheral edge is 10°.

4. The flow deflector according to claim 1, wherein the angle α of at least one row of channels closest to the center A of the deflector is 60°.

5. The flow deflector according to claim 1, wherein the ejection channels in each row are oriented at the same angle α.

6. The flow deflector according to claim 1, wherein the angles α vary by 3° to 8° between two consecutive rows.

7. The flow deflector according to claim 1, wherein the wall has a central portion with no ejection channels.

8. The flow deflector according to claim 1, wherein the ejection channels occupy at least 50% of the surface of the wall.

9. The flow deflector according to claim 1, wherein the wall of the deflector is spherical in shape.

10. The flow deflector according to claim 1, wherein each ejection channel passes through either side of the wall and has a constant circular cross section.

11. A discharge valve system of a bypass turbine engine compressor comprising:

a flow deflector according to claim 1;

a pipe connected to the flow deflector and comprising a hot-air inlet;

a regulation device configured to regulate the passage of the discharge airflow between the hot-air inlet of the pipe and the flow deflector; and an actuator acting on the regulation device so that the regulation device occupies at least a first position in which the hot-air inlet is closed and a second position in which the hot-air inlet is free.

12. A bypass turbine engine comprising a primary duct in which a hot flow circulates and a secondary duct in which a cold flow circulates, the ducts being separated by an inter-duct casing, wherein at least one discharge valve system according to claim 11 is arranged in the inter-duct casing.

* * * * *